Patented Nov. 4, 1947

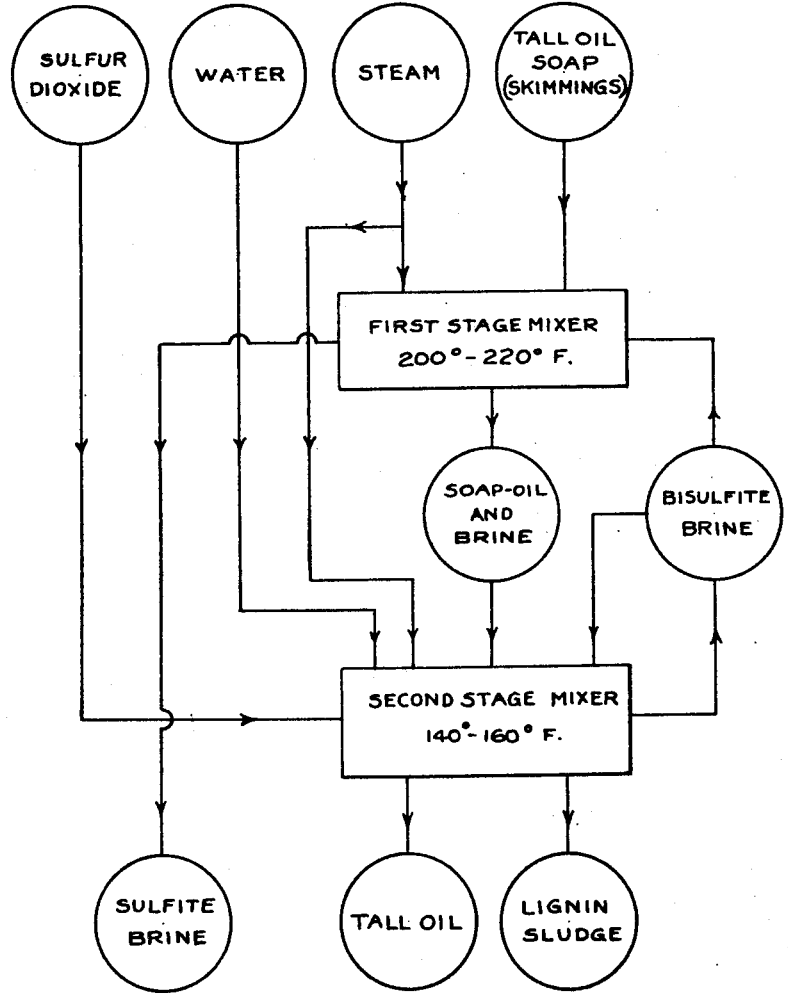

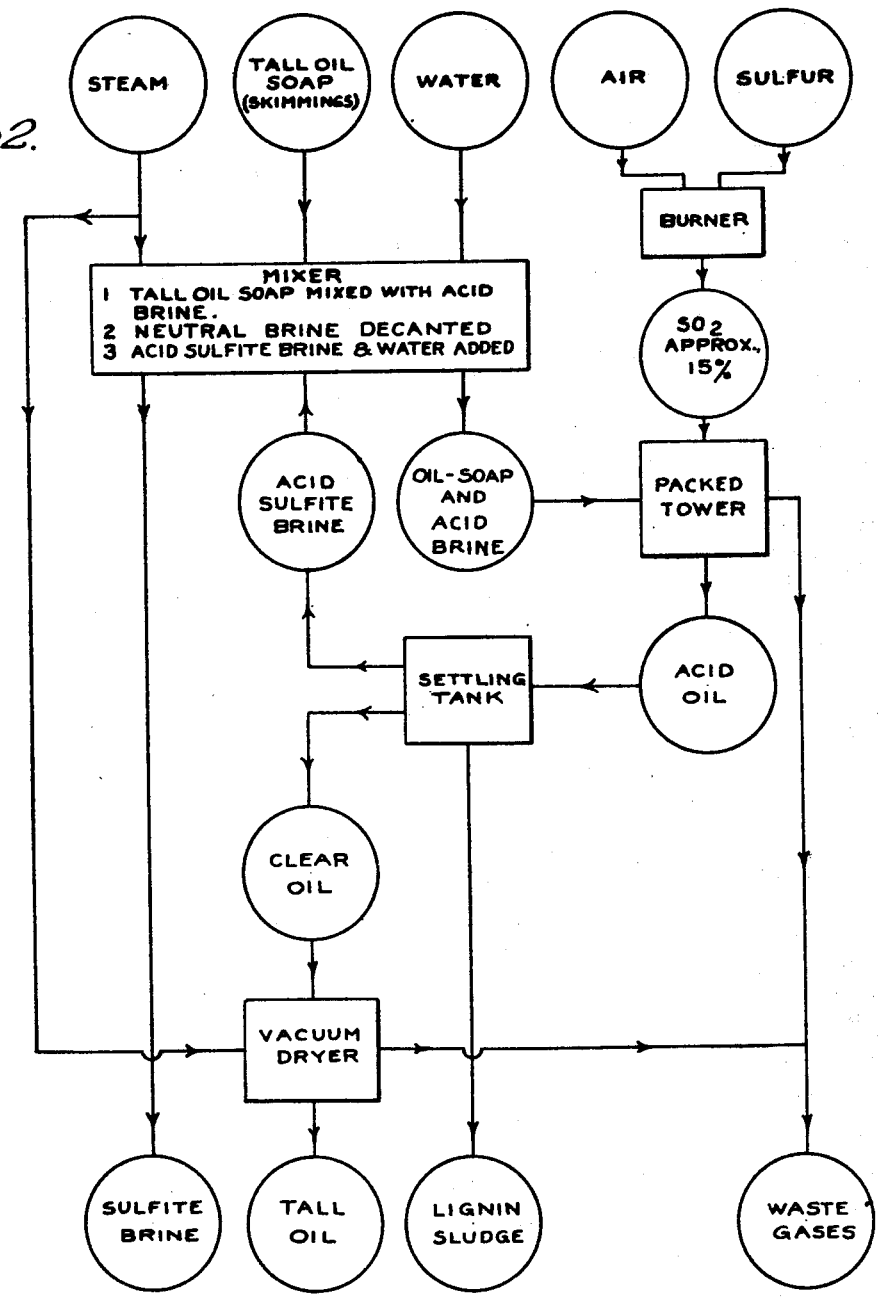

2,430,029

UNITED STATES PATENT OFFICE 2,430,029

SPLITTING TALL OIL SOAPS

Arthur Pollak, Paul E. Chapman, and Randall Hastings, Charleston, S. C., assignors to West Virginia Pulp and Paper Company, New York, N. Y., a corporation of Delaware Application April 27, 1944, Serial No. 532,982

14 Claims. (Cl. 260—97.5)

Our present invention relates to a method of acidifying or splitting tall oil soaps or skimhings to convert them to the corresponding acids (tall oil), which involves the use of sulfur dioxide as a reactant.

As is well known, tall oil is a mixture comrised essentially of fatty and rosin acids occurring naturally in pine wood and is produced as a byproduct of the soda and sulfate pulp industry. When the pine chips are cooked in an alkaline liquor, the contained fatty and rosin acids are saponified and dissolved in the cooking liquor. When the latter is concentrated sufficiently the tall oil soaps precipitate out and are skimmed off the liquor undergoing concentration. To recover the tall oil it is necessary to treat the skimmings with an acid substance, thereby precipitating out the corresponding acids. As heretofore practised, the method of precipitating has yielded a dark, viscous liquid having an unpleasant odor.

We have now discovered that by splitting the tall oil skimmings with sulfur dioxide or acid salts derived therefrom, not only is the reaction carried to substantial completion (i. e., to the same degree as is had with the usual sulfuric acid treatment), but, very surprisingly, a light colored pleasant smelling tall oil results. While sulfur dioxide is generally known as a bleaching agent, the bleaching and purifying effect obtained seems to be involved in the reaction of the soap splitting and recovery of the tall oil, since merely bubbling sulfur dioxide gas through ordinary tall oil even for prolonged periods does not effect any appreciable bleaching thereof.

While tall oil is precipitated by passing sulfur dioxide gas through a solution or suspension of tall oil soaps, in practice unless special precautions are taken difficulties arise in such an operation due to the formation of gels or greases of soap and tall oil, which are too stiff to be mixed or pumped. Furthermore, in order for the soap splitting reaction to go to completion, it is necessary to add sufficient sulfur dioxide to bring the pH down to approxixmately 3.5, at which all of the sodium sulfite is in the acid form, i. e., as NaHSO₃. The reaction, then, may be represented as follows:

$$RNa + SO_2 + H_2O \rightarrow RH + NaHSO_3$$

where R stands for the tall oil acid radical. Thus, one atom of sulfur is required for each molecule of the acid produced. If the reaction be terminated short of this point, then the tall oil will be contaminated with substantial amounts of unconverted or reconverted soap. For many purposes the formation of the acid sulfite salt is a disadvantage, since it is highly corrosive and cannot be used directly in the chemical recovery cycles as ordinarily practised in the pulping of pine wood.

After much experimentation we have discovered that the aforementioned difficulties may be avoided, with substantially twice the yield of purified tall oil per pound of sulfur dioxide used, by conducting the acidification in two stages. In the first stage the tall oil soaps are mixed with a sodium bisulfite (NaHSO₃) brine (formed in the second stage), whereupon the soaps are in large part split with the formation of normal sodium sulfite, Na₂SO₃. This material, which as formed is substantially neutral, presents no difficulties in handling. Having accomplished approximately half the conversion of the tall oil soaps to the corresponding acids in the first stage, the resulting mixture of tall oil and soap and occluded brine (which will hereafter be referred to as "soap oil") after removal of the formed sodium sulfite brine is then further treated with sulfur dioxide. For best results it has been found desirable to have present an excess of sodium acid sulfite during the SO₂ treatment, thereby insuring against the formation of troublesome gels.

The reactions involved are essentially the following:

(1) $RNa + NaHSO_3 \rightleftarrows RH + Na_2SO_3$
(2) $RNa + SO_2 + H_2O \rightleftarrows RH + NaHSO_3$ Since the NaHSO₃ formed in Reaction 2 is used in Reaction 1, one equivalent of sulfur thus theoretically produces two equivalents of tall oil. Reaction 2 for the formation of the tall oil acids goes to substantial completion.

For a clear understanding of our invention reference is made to the following detailed illustrative examples taken with the annexed flow sheets, Figs. 1 and 2 of which set forth the steps of Examples 1 and 2, respectively.

*Example 1.*—2000 g. of crude tall oil skimmings from black liquor, containing approximately 65% sodium soaps, the remainder consisting of water, occluded black liquor and other impurities, was mixed in the first stage mixer with 1265 g. of approximately 15% sodium acid sulfite brine, the soap being added to the brine and the mixture heated with steam to a final temperature in the range preferably between 200° and 220° F. This added brine has a pH of 3.5 substantially. After stirring until the reaction has reached substantial equilibrium, the mixture was allowed to settle with the formation of a supernatant soap-oil layer, the lower layer being brine. The lower brine layer weighing 1600 g. was then siphoned off, its pH being about 7, indicating that the brine consisted principally of the normal sulfite, i. e., Na₂SO₃. The soap oil layer, weighing 1775 g. was then transferred to the second stage mixer to which was added 700 g. of 15% acid sulfite brine and 600 g. of water. 155 g. of sulfur dioxide gas was passed into the second stage mixer while maintaining the temperature in the preferred range of 140–160° F. The reaction having gone to completion, the brine-tall oil mixture was allowed to settle for a period of 18 hours, whereupon a clear purified oil was siphoned off and the resulting acid sulfite brine was returned to storage to be available for reaction with fresh tall oil skimmings and for recirculation to the second mixer. Also removed was a quantity of lignin sludge derived from the black liquor occluded in the skimmings. (The slight residual odor of sulfur dioxide can be removed from the oil by heating, or by blowing with steam, or by vacuum drying.) The Lovibond color of the oil was red 8.5 and yellow 70, using an 0.5 inch column. This is far superior to a color of red 25 to 30, yellow 175 to 200, using an 0.5 inch column for tall oil obtained from skimmings by acidification with sulfuric acid.

*Example 2.*—As shown in Fig. 2, 40 lbs. of tall oil skimmings was gradually added to 28 lbs. of approximately 15% acid sodium sulfite brine, the mixture stirred and heated with steam to a final temperature in the range preferably between 200–220° F. The neutral brine formed, weighing 40 lbs., was decanted and 16 lbs of additional acid sulfite brine and 12 lbs. of water added. The resulting soap-oil and acid brine mixture was then fed downwardly through a packed tower in contact with sufficient sulfur burner gas to effect complete conversion of the remaining tall oil soap to tall oil. The acidified oil and brine from the tower was then led to a settling tank maintained between 140–160° F., the acid sulfite brine separated weighed 46 lbs. and was fed back to the mixer, the acidified oil weighing 23 lbs. was vacuum dried.

The temperature in the first mixing operation is desirably maintained close to the boiling point of the brine for the reason that the reaction is quicker and more complete at these relatively high temperatures; and furthermore, the separation of the oil and brine into separate layers is facilitated. In the second mixing operation in which the soap oil undergoes a further reaction with sodium acid sulfite and sulfur dioxide we have found the temperature of 140–160° F. given in the flow sheet of Fig. 1 to be the most favorable; beyond this temperature an appreciable loss of sulfur dioxide ensues and some reversion of the oil to soap may occur. In general, strong solutions of sodium acid sulfite are not stable at temperatures appreciably beyond 160° F. It will be noted that sodium bisulfite in solution yields free sulfurous acid in accordance with the equation $2NaHSO_3 \rightleftarrows Na_2SO_3 + H_2SO_3$. When sulfur dioxide dissolves in water it also forms sulfurous acid in accordance with the equation $$H_2O + SO_2 \rightleftarrows H_2SO_3$$

Considerable latitude may be had in the degree of concentration of brine used in the two stages, it being found that the higher the brine concentration in the first stage, the less brine is occluded in the soap oil.

In the second mixing stage the concentration of the acid sulfite brine is preferably kept between 15 and 20% for facilitating the separation of a clear tall oil, although separation can be had at concentrations above and below this range. As in any acidification process, the final pH of the mixture determines the amount of residual soap left in the tall oil. By bringing the pH down to 4, which it is possible to do using sulfur dioxide, the tall oil will be substantially free of soap. Operating at a pH of about 5, conversion from soap to tall oil is only about 95% complete.

If for any reason it should be desired to carry out the conversion of the tall oil soaps in a single operation, as for example when sodium acid sulfite is desired as a product of the reaction, this may be accomplished by feeding the skimmings directly to the second stage mixer (Fig. 1) preferably in the presence of acid sulfite brine, sulfur dioxide being added at a sufficient rate to maintain the brine acid, the latter aiding in the prevention of gels. In order for the reaction to go to substantial completion yielding a substantially soap-free tall oil, the admission of sulfur dioxide should be kept up until the pH of the reacting mixture is about 3.5. An example of this manner of proceeding follows:

*Example 3.*—1000 g. of crude tall oil skimmings were added slowly to 1172 g. of approximately 15% sodium bisulfite brine while agitating and slowly raising the temperature to 210° F. After the addition of skimmings was complete the mixing at 210° F. was continued for one half hour at which time the brine tested 6.6 pH. 127 g. of sulfur dioxide gas was then passed through the mixture over the course of 4.5 hours during which time the temperature was allowed to fall to 140° F., the brine pH falling to 4.2. The brine was then allowed to settle and the oil decanted off and dried.

Gels are avoided in the foregoing example by reason of the fact that the crude tall oil soaps are maintained at all times in an acid medium, i. e., one having a pH below 7. This precaution is therefore of great importance.

If desired, the mixture of crude tall oil soaps and acid sodium sulfite brine may be sulfited by passing the mixture into the top of the tower, Fig. 2, while admitting at the bottom of the tower a counter current stream of sulfur dioxide-containing gas.

Having regard now to the preferred two-stage process, it will be seen from the foregoing that by so conducting the conversion of the tall oil soaps to tall oil it is possible to have the conditions in each stage most favorable to the reactions there occurring. Thus, in the first stage the temperature may be maintained close to the boiling point of the brine, thereby facilitating the separation of the formed soap oil. This would not be possible were sulfur dioxide used in this stage, for the reason that either a pressure vessel would have to be used, or a loss of $SO_2$ would result.

We wish it to be understood that the principle of our invention may be utilized in other embodiments thereof without departing from the spirit of our invention or the scope of the appended claims.

We claim:

1. In the method of converting crude black liquor skimmings comprising crude tall oil soap into tall oil, the step which consists in reacting the crude black liquor skimmings in aqueous solution with sulfur dioxide gas in the presence of sodium bisulfite in excess of that formed in the occurring reaction.

2. In the method of converting soluble tall oil soaps into tall oil, the step which consists in reacting said soaps in aqueous solution with sulfur dioxide gas until the pH of the mixture is brought below 5, in the presence of sodium bisulfite in excess of that formed in the occurring reaction.

3. In the method of converting soluble tall oil soaps into tall oil, the steps which consist in mixing said soaps with a brine of a sodium salt of sulfurous acid containing a sufficient excess of free sulfurous acid so as to have a pH below 7 and then treating the mixture with sulfur dioxide gas until conversion is complete.

4. In the method of converting soluble tall oil soaps into tall oil, the steps which consist in passing a mixture of tall oil soap and sodium sulfite brine through a tower countercurrent to sulfur dioxide-containing gas, removing therefrom the liquid products of the reaction, and separating therefrom the tall oil.

5. The method of converting soluble tall oil soaps into tall oil, which consists in bringing about partial conversion of said soap to tall oil by the reaction thereon of acid sodium sulfite brine, removing normal sodium sulfite formed and then bringing the conversion to substantial completion by reacting the mixture of unconverted soap and tall oil in aqueous solution with sulfur dioxide.

6. The method according to claim 5, including the step of recirculating the formed acid sodium sulfite to reaction with further quantities of tall oil soap.

7. The method according to claim 5, in which the sulfur dioxide is added until a pH of less than 5 is reached.

8. The method according to claim 5, in which the step of bringing the conversion to completion is had in the presence of a sodium sulfite brine maintained on the acid side.

9. The method of converting soluble tall oil soaps into tall oil, which consists in forming a mixture of the tall oil soap and sodium acid sulfite brine, allowing the reaction to proceed with the formation of normal sodium sulfite, removing said normal sodium sulfite, passing the mixture of tall oil and unconverted soap in the presence of a sulfite brine having an acid reaction into contact with gaseous sulfur dioxide-containing gas until the conversion has been completed to the desired degree, and separating the formed tall oil from the brine.

10. The method according to claim 9, in which the reaction of the tall oil soap and the sodium acid sulfite brine is carried out at temperatures above 200° F. and not exceeding the boiling point of the brine.

11. The method according to claim 9, in which the reaction of the tall oil soap and sulfur dioxide is carried out at temperatures in the range 140–160° F.

12. The method of converting soluble tall oil soaps into tall oil, which consists in bringing about partial conversion of said soap to tall oil by the reaction thereon of acid sodium sulfite brine, removing normal sodium sulfite formed after a pH in the solution of around 7 is reached, and then bringing the conversion to substantial completion by reacting the mixture of unconverted soap and tall oil in aqueous solution with sulfur dioxide.

13. The method according to claim 12, in which about half of the tall oil soap is converted to tall oil in the first step by the action of the acid sodium sulfite brine.

14. In the method of converting crude black liquor skimmings comprising crude tall oil soap without the formation of objectionable gels, the steps which consist in adding said soap to an aqueous solution containing sodium sulfite and sufficient free sulfurous acid to give the solution a pH of below 5 and introducing into the mixture sulfur dioxide at a rate sufficient to maintain said pH at not greater than 5 as the soap reacts with said free sulfurous acid to form sodium bisulfite and free tall oil acids.

ARTHUR POLLAK.
PAUL E. CHAPMAN.
RANDALL HASTINGS.

REFERENCES CITED

The following references are of record in the file of this patent:

UNITED STATES PATENTS

| Number | Name | Date |
|---|---|---|
| 2,012,125 | French | Aug. 20, 1935 |